(12) United States Patent
Dai

(10) Patent No.: US 6,734,413 B2
(45) Date of Patent: May 11, 2004

(54) ZERO DC CURRENT READOUT CIRCUIT FOR CMOS IMAGE SENSOR USING A PRECHARGE CAPACITOR

(75) Inventor: Tiejun Dai, Santa Clara, CA (US)

(73) Assignee: OmniVision Technologies, Inc., Sunnyvale, CA (US)

( * ) Notice: Subject to any disclaimer, the term of this patent is extended or adjusted under 35 U.S.C. 154(b) by 127 days.

(21) Appl. No.: 10/011,555

(22) Filed: Nov. 6, 2001

(65) Prior Publication Data

US 2003/0085337 A1 May 8, 2003

(51) Int. Cl.$^7$ .................................................. H01L 27/00
(52) U.S. Cl. .................................................... 250/208.1
(58) Field of Search ........................ 250/208.1, 214.1; 348/308, 241, 300

(56) References Cited

U.S. PATENT DOCUMENTS

| | | | |
|---|---|---|---|
| 5,869,857 A | * | 2/1999 | Chen .......................... 257/292 |
| 5,969,758 A | | 10/1999 | Sauer et al. |
| 6,297,492 B1 | | 10/2001 | Clark |

\* cited by examiner

*Primary Examiner*—Thanh X. Luu
(74) *Attorney, Agent, or Firm*—Perkins Coie LLP

(57) ABSTRACT

A method of reading out a light signal from a pixel is disclosed. The method comprises first charging a capacitor to a predetermined voltage during a precharge stage. Next, during a readout stage, discharging the capacitor for a predetermined length of time through a pixel output transistor. The pixel output transistor is modulated by the light signal by applying the light signal to the gate of the pixel output transistor. Finally, the output signal is determined to be the voltage held by the capacitor.

10 Claims, 4 Drawing Sheets

ZERO DC CURRENT READOUT CIRCUIT FOR CMOS IMAGE SENSOR USING A PRECHARGE CAPACITOR

TECHNICAL FIELD OF THE INVENTION

The present invention relates to CMOS image sensors used in scanners, and more particularly, to a readout circuit in the CMOS image sensor that draws no DC current during readout.

BACKGROUND OF THE INVENTION

Scanners are commonly used in connection with a personal computer (PC) to digitize a document. The document may be a textual document or other type of document, such as a photograph. One of the important components of a scanner is the imaging device. In many modem scanners, the imaging device is a CCD image sensor. Recently, CMOS image sensors have made significant inroads into applications previously dominated by CCD image sensors. This is due in part to the lower cost and lower power consumption of CMOS image sensors. These advantages are particularly important in PC camera applications, security applications, cell phone applications, and the like.

Depending upon the particular application, CMOS image sensors come in a variety of array sizes. High-resolution image sensors with over one million pixels are used in digital still cameras, while lower resolution CIF, VGA, or SVGA formats are used for security camera or PC camera applications. In many applications, the pixel array size is on the order of 352–1280 pixels per row with 288–1024 pixels per column.

For scanner applications, the pixel array has significantly different dimensions. Typically, approximately 10,000 pixels are in each row. Specifically, most scanners are manufactured to scan documents 8.5 inches wide. At a resolution of 1200 dots per inch (dpi), this requires a little over 10,000 pixels. Further, a black and white scanner will only require a single row of pixels. However, for a color scanner, three rows of 10,000 pixels are required, one row for the color red, one row for the color green, and one row for the color blue.

During readout of the signals from each pixel in the array, there is typically a current associated with the readout process. If a large number of pixels must be read out simultaneously, then a large current is required. The large current required will also cause a voltage drop in the power supply line and also affect the ground line of the image sensor. This in turn will cause non-uniformity and decrease in the signal range of the image sensor.

While this is an issue for many image sensors, the problem is complicated by the need to read out over 30,000 pixels simultaneously for a color image sensor used in a scanner. Moreover, because of the large number of pixels in a row, the actual dimension of the pixel array is on the order of 2 centimeters. Because of this, the metal lines used as power and ground are unusually long compared to image sensors used in other applications. For this additional reason, the voltage drop in the power and ground lines is problematical.

BRIEF DESCRIPTION OF THE DRAWINGS

The foregoing aspects and many of the attendant advantages of the invention will become more readily appreciated as the same become better understood by reference to the following detailed description, when taken in conjunction with the accompanying drawings, wherein.

DETAILED DESCRIPTION OF THE PREFERRED EMBODIMENT

In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As noted above, a CMOS image sensor includes an array of pixels formed into columns and rows. For a color scanner application, the array consists of three rows of pixels, one for each primary color. Each of these pixels must be read out in some manner. Typically, each column of pixels has associated therewith a readout circuit, which is the subject of the present invention. In the description below, a single pixel is described in connection with a readout circuit. It can be appreciated that multiple readout circuits would be required for the full image sensor.

Figure 1:
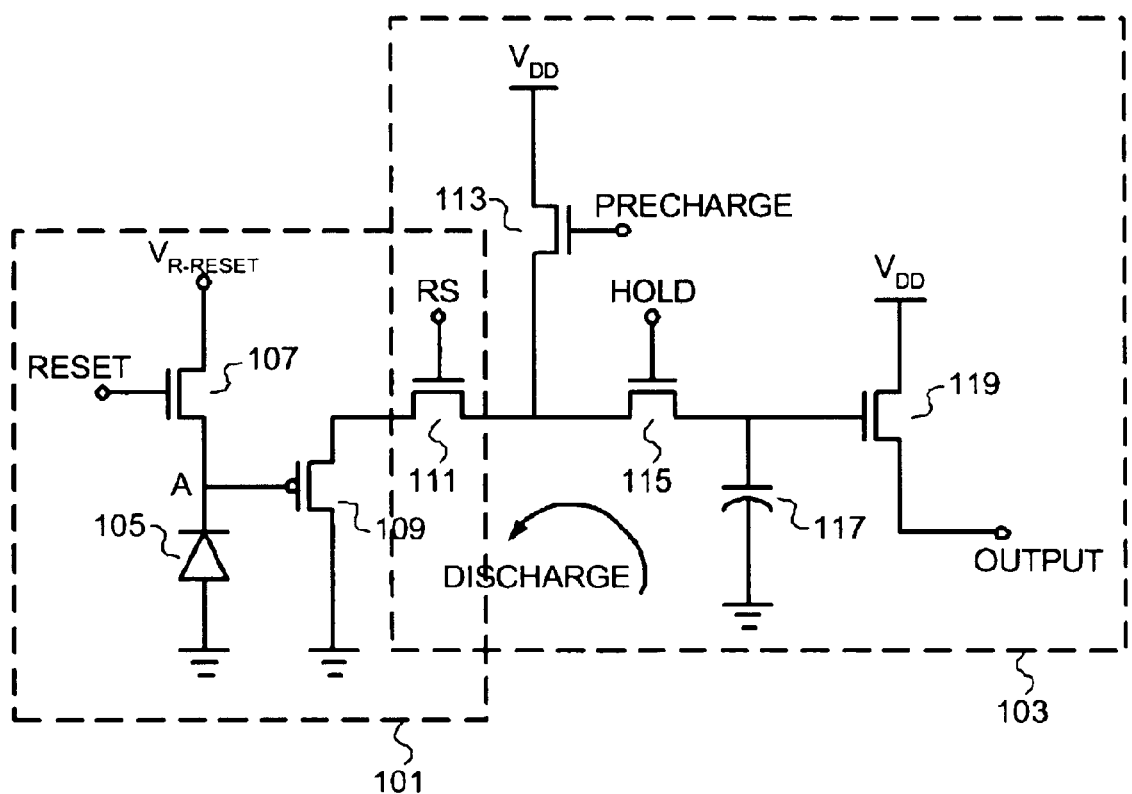
FIG. 1 is a schematic diagram of a readout circuit formed in accordance with the present invention.

Turning to FIG. 1, an active pixel 101 is shown connected to a readout circuit 103. The active pixel 101 includes a photodiode 105, a reset transistor 107, pixel output transistor 109, and row select transistor 111. The readout circuit 103 includes a precharge transistor 113, a hold transistor 115, a capacitor 117, and an amplifying output transistor 119. Because the row select transistor 111, in some interpretations, may not be explicitly considered part of the pixel 101, the row select transistor 111, alternatively, may be considered part of the readout circuit 103. Similarly, the pixel output transistor 109 may also be considered as a part of the readout circuit 103.

The photodiode is connected between ground and the source of reset transistor 107 at a node A. The drain of reset transistor 107 is connected to a voltage rail set at a value ($V_{R\_reset}$). $V_{R\_reset}$ is a reference voltage, which could be in one embodiment $V_{DD}$, or a value lower than $V_{DD}$. The gate of the reset transistor 107 is controlled by a reset signal line. The reset transistor 107 operates as a switch that is controlled by the reset signal line.

Further, the source of the reset transistor 107 (corresponding to the "output" of the photodiode 105) is connected to the gate of the pixel output transistor 109. In this manner, the pixel output transistor 109 is designed such that the voltage output by the photodiode 105 will cause the pixel output transistor 109 to operate in the linear region. As will be seen below, this will modulate the magnitude of a signal to be output. In one embodiment, the pixel output transistor 109 is a PMOS, however, as will be seen below in other embodiments, an NMOS may also be used.

The pixel output transistor 109 is connected between ground and the source or drain of row select transistor 111. The gate of the row select transistor 111 is connected to a row select (RS) signal line. The row select transistor 111 operates as a switch that is controlled by the row select signal line.

The source or drain of the row select transistor 111 is connected to the source or drain of the hold transistor 115. The gate of the hold transistor 115 is connected to a hold signal line. The hold transistor 115 operates as a switch that is controlled by the hold signal line.

Also connected to the source or drain of the row select transistor 111 is the source of the precharge transistor 113. The gate of the precharge transistor 113 is connected to a precharge signal line. The precharge transistor 113 operates as a switch that is controlled by the precharge signal line.

The drain of the hold transistor 115 is connected to one terminal of the capacitor 117. The other terminal of the capacitor 117 is connected to ground. Further, the drain of the hold transistor 115 is connected to the gate of the output transistor 119. In this conventional amplification configuration, the amplifying output transistor 119 serves as an amplification element.

In this embodiment, the readout circuit 103 operates in two stages, a precharge stage and a readout stage. In the precharge stage, the row select signal is low, causing the row select transistor 111 to be off. The precharge signal and hold signal is high, causing the precharge transistor 113 and hold transistor 115 to be on. This causes the voltage $V_{DD}$ to be placed on capacitor 117, thereby charging the capacitor 117. After the capacitor 117 has been charged, the precharge signal and hold signal is then put to low, causing the precharge transistor 113 and hold transistor 115 to be off.

During the readout stage, the row select signal and the hold signal is high, turning on the both of these transistors 111 and 115. This will cause the capacitor 117 to discharge via a current flowing through the pixel output transistor 109. The discharge current decreases rapidly with time. After a predetermined and consistent amount of time, the row select signal and the hold signal is then put to low, turning off the both of these transistors 111 and 115, and ending the discharge process.

The rate at which the capacitor 117 is discharged is controlled by the signal on the gate of pixel output transistor 109. If a high signal is output by the photodiode 105, then in the case of the PMOS transistor 109, the pixel output transistor 109 allows minimal current discharge, thereby preserving a high signal to be stored on the capacitor 117. If a low signal is output by the photodiode 105, then in the case of the PMOS transistor 109, the pixel output transistor 109 allows maximal current discharge, thereby preserving a low signal to be stored on the capacitor 117. In such a manner, the output of the photodiode 105 modulates the amount of charge that remains stored on the capacitor 117. The voltage that is stored on the capacitor 117 is then used to control the amplifying output transistor 119. Note that the readout result is insensitive to the precharge voltage value of the capacitor C, as long as it is consistently applied and as long as the time during the readout stage is consistent.

After the signal has been read out, the photodiode 105 is reset using the reset transistor 107. The resetting of the pixel 101 through reset transistor 107 may be done at or about the same time as the precharge operation. Note that the operation of the reset transistor 107 is commonly used to reset the photodiode 105 after the signal is read out. This process is well known in the prior active pixel art. During the reset operation, the voltage at node A is set to voltage ($V_{R\_reset}$). As the photodiode 105 proceeds through the integration time, where the photodiode 105 is gathering light, the voltage at node A decreases in proportion to the amount of gathered light.

Several advantages of the present invention are noticed. First, because no DC current is drawn during readout, this requires less power. Indeed, calculations indicate that only approximately 10% of the power of prior readout circuits is required.

Second, there is a high uniformity and large signal range. During readout, the discharge current flows inside the readout circuit. Because there is no current on the outside power and ground lines, there is no voltage drop along the power and ground lines.

In general terms, the present invention uses a capacitor to store a predetermined charge during a precharge stage. Next, during a readout stage, the signal from a photodiode is then used to modulate the amount of charge that is discharged from the capacitor. The remaining charge on the capacitor after the discharge during the readout stage is then amplified as a signal and output.

Figure 2:
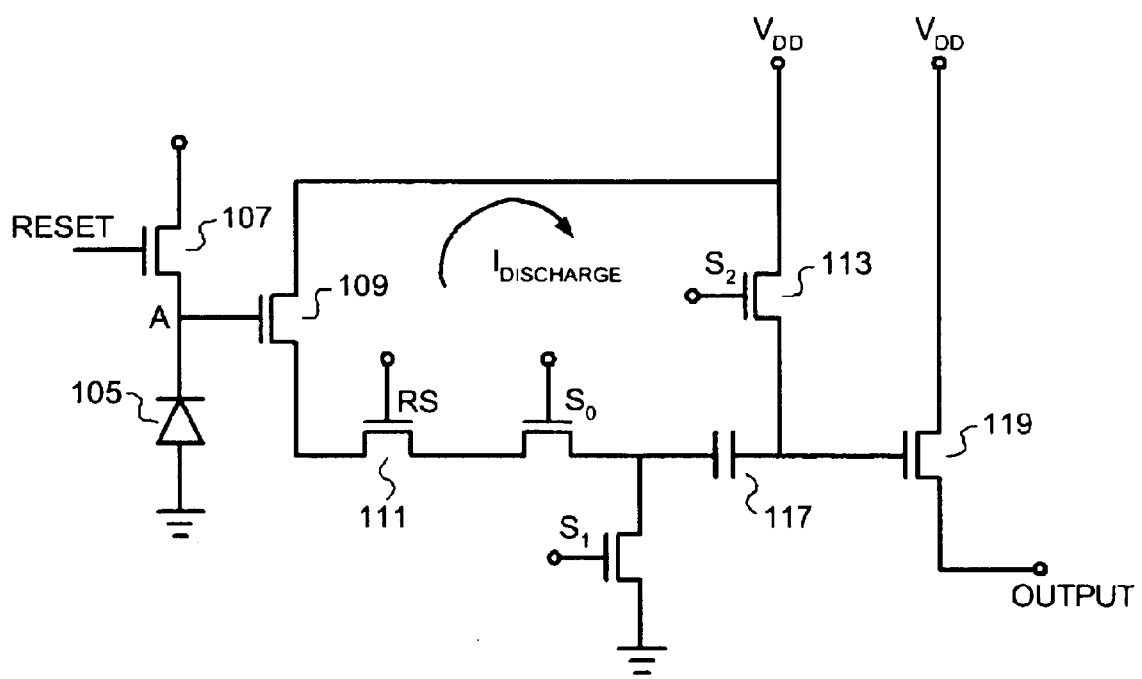
FIG. 2 is a schematic diagram of a readout circuit formed in accordance with an alternative embodiment of the present invention.

FIG. 1 illustrates one possible configuration of a readout circuit that can implement this technique. However, it can be appreciated that other configurations for the readout circuit is possible. For example, FIG. 2 shows such an alternative embodiment.

In this embodiment, the capacitor 117 is charged by having the row select transistor 111 off and the precharge transistor 113 and a ground transistor S1 on. This charges the capacitor 117 to a voltage $V_{DD}$. After the capacitor 117 has been charged, the precharge transistor 113 and the ground transistor S1 is turned off. This allows the capacitor 117 to carry an initial voltage $V_{DD}$, but still allowing the capacitor 117 to discharge during a readout stage.

Specifically, during the readout stage, the row select transistor 111, the precharge transistor 113, and the transistor S0 is turned on. This allows the capacitor 117 to discharge through the pixel output transistor 109, as modulated by the signal at node A from the photodiode 105. While the term "discharge" is used, charge is actually being placed (through pixel output transistors 109, row select transistors 111, and transistor S0) onto one plate of the capacitor 117 to equalize (or "discharge") the voltage on the capacitor 117.

Figure 3:
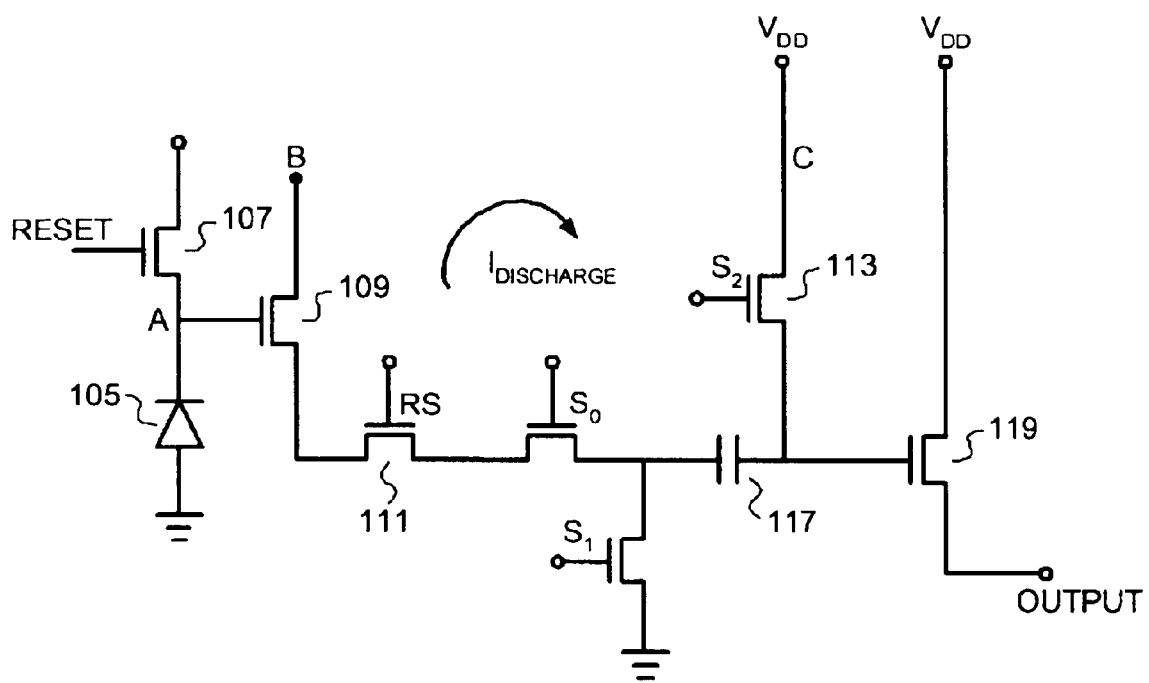
FIG. 3 is a schematic diagram of a readout circuit formed in accordance with another alternative embodiment of the present invention.

In some situations, it is not possible to form a discharge current path inside the readout circuit. FIG. 3 shows an embodiment that remedies this situation. Specifically, FIG. 3 is substantially similar to FIG. 2, except that node B is not connected to node C. In this situation, during readout, there is a discharge current in the outside power and ground lines. Although the discharge current rapidly decreases rapidly with time, there is still a small voltage drop along the power and ground lines at the end of the readout stage. Thus, this embodiment is less desirable than the circuits of FIGS. 1 and 2, but still more desirable than the prior art.

In all of these embodiments, the capacitors in the readout circuits can be charged simultaneously or individually. For simultaneous charging, this will cause a relatively large current and associated drop in the power line. Therefore, it would be undesirable to read out data at this time.

Figure 4:
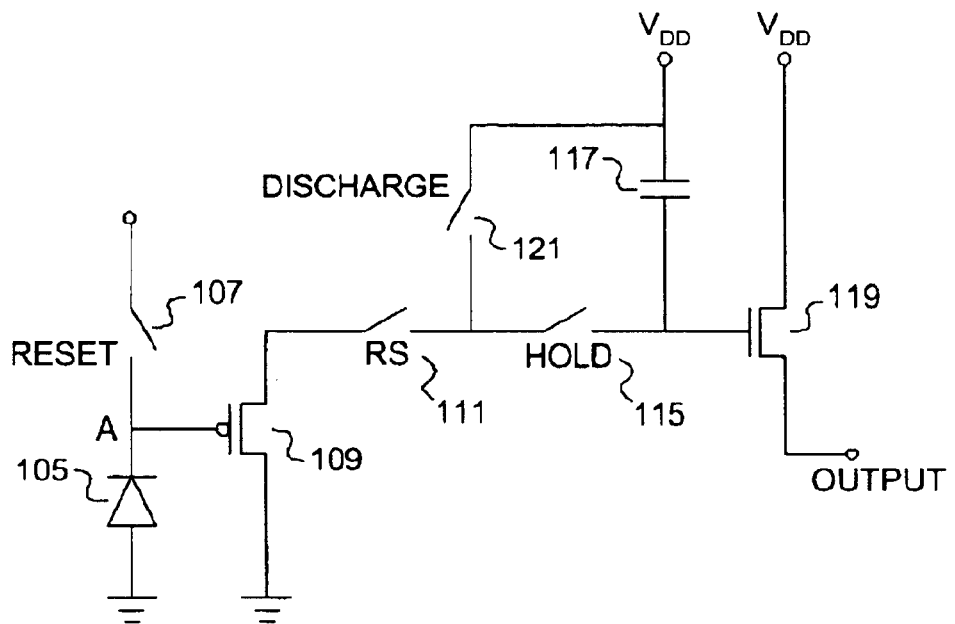
FIG. 4 is a schematic diagram of a readout circuit formed in accordance with yet another alternative embodiment of the present invention.

FIG. 4 shows yet another alternative embodiment. In this embodiment, the capacitor is discharged first, and then a readout step is performed. While much of the individual components are similar to that of FIGS. 1–3, the arrangement and operation is different. Specifically, the photodiode 105, the reset transistor 107, the pixel output transistor 109, and the row select transistor 111 are substantially configured the same as previous embodiments. However, in a first discharge stage, the row select transistor 111 is turned off and a discharge transistor 121 and hold transistor 115 is turned on. This will discharge the capacitor 117, resulting in no voltage differential between the anode and cathode (both at the same potential $V_{DD}$). After the discharge cycle is complete, the discharge transistor 121 and hold transistor 115 are turned off.

During the readout stage, the row select transistor 111 and hold transistor 115 is turned on. This results in the capacitor being charged by having current flow through the hold transistor 115, the row select transistor 111, and the pixel output transistor 109 to ground. In other words, the voltage at the capacitor plate connected to the gate of the amplifying output transistor 119 steadily decreases from $V_{DD}$ towards ground as current flows. This "charges" the capacitor 117.

The amount of current flow is modulated by the signal at node A as applied to the gate of pixel output transistor 109. Thus, the amount of voltage differential between the anode and cathode of the capacitor 117 is dependent upon the pixel output transistor 109, as modulated by the signal output from photodiode 105 at node A. This signal is thus stored in the capacitor 117, and then output through the amplifying output transistor 119.

Figure 5:
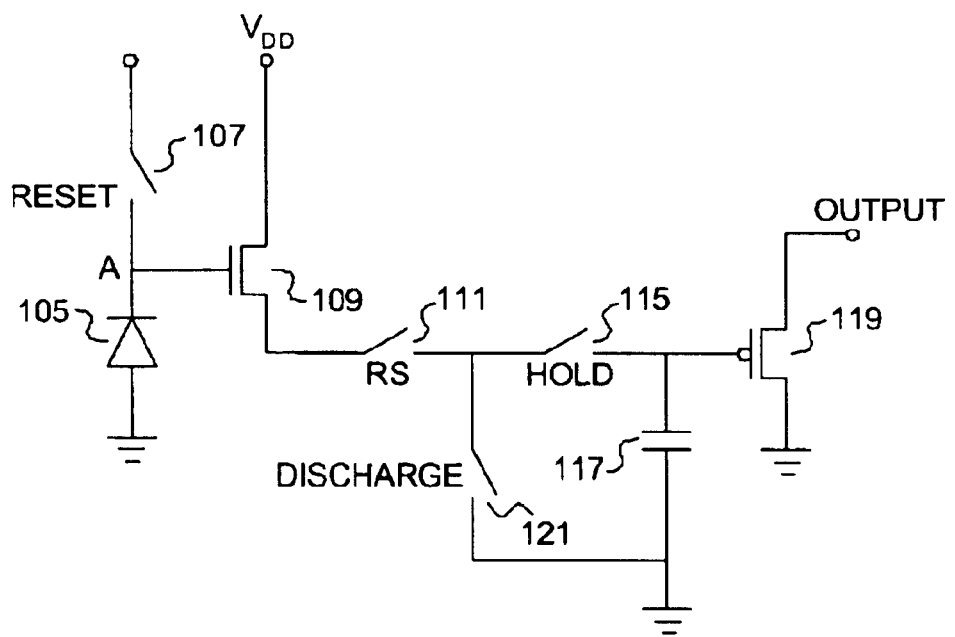
FIG. 5 is a schematic diagram of a readout circuit formed in accordance with yet another alternative embodiment of the present invention.

The circuit of FIG. 5 works in substantially similar manner. Specifically, in a first discharge stage, the row select transistor 111 is turned off and a discharge transistor 121 and hold transistor 115 is turned on. This will discharge the capacitor 117, resulting in no voltage differential between the anode and cathode (both at the same ground potential). After the discharge cycle is complete, the discharge transistor 121 and hold transistor 115 are turned off.

During the readout stage, the row select transistor 111 and hold transistor 115 is turned on. This results in the capacitor being charged by having current flow from $V_{DD}$ through the hold transistor 115, the row select transistor 111, and the pixel output transistor 109. In other words, the voltage at the capacitor plate connected to the gate of the amplifying output transistor 119 steadily increases from ground to $V_{DD}$ as current flows. This "charges" the capacitor 117.

The amount of current flow is modulated by the signal at node A as applied to the gate of pixel output transistor 109. Thus, the amount of voltage differential between the anode and cathode of the capacitor 117 is dependent upon the pixel output transistor 109, as modulated by the signal output from photodiode 105 at node A. This signal is thus stored in the capacitor 117, and then output through the amplifying output transistor 119.

The embodiments of FIGS. 4 and 5 both generate a small current and voltage drop in the power and ground lines at the end of the readout stage. However, the embodiments of FIGS. 4 and 5 can realize the discharge path inside the readout circuit easily during layout. Further, the discharge time of these embodiments is relatively short.

While the preferred embodiment of the invention has been illustrated and described, it will be appreciated that various changed can be made therein without departing from the spirit and scope of the invention. For example, while the present invention has been described in terms of using a photodiode, other types of light sensing elements may also be used, such as a photogate and the like. Further, the above examples are described using a p-type substrate and photodiode. For an n-type substrate or a photogate sensor, the present invention is equally applicable to one of ordinary skill.

Thus, one of ordinary skill after reading the foregoing specification will be able to affect various changes, alterations, and substitutions of equivalents without departing from the broad concepts disclosed. It is therefore intended that the scope of the letters patent granted hereon be limited only by the definitions contained in appended claims and equivalents thereof, and not by limitations of the embodiments described herein.

What is claimed is:

1. A readout circuit comprising:

a capacitor to be charged during a precharge stage to a predetermined voltage;

a precharge transistor for activating during a precharge stage so as to selectively charge said capacitor to said predetermined voltage; and a pixel output transistor having a gate modulated by a light signal output by a light sensing element, said pixel output transistor connected to said capacitor during a readout stage so as to selectively discharge said capacitor.

2. The readout circuit of claim 1 further including an amplifying output transistor having its gate coupled to said capacitor such that the voltage stored on said capacitor after completion of a readout stage modulates the current flow of said amplifying output transistor.

3. The readout circuit of claim 1 further including a row select transistor between said capacitor and said pixel output transistor.

4. A method of reading out a light signal from a pixel comprising:

charging a capacitor during a precharge stage;

discharging said capacitor through a pixel output transistor, said pixel output transistor being modulated by said light signal; and determining the voltage held by said capacitor as an output signal.

5. The method of claim 4 further including amplifying said output signal by placing said output signal onto the gate of an amplifying output transistor.

6. The method of claim 4 wherein said charging of said capacitor charges said capacitor to a predetermined voltage.

7. The method of claim 4 wherein said discharging of said capacitor is for a predetermined length of time.

8. The method of claim 6 wherein said light signal modulates said pixel output transistor by applying said light signal to the gate of said pixel output transistor.

9. A method of reading out a light signal from a pixel comprising:

charging a capacitor to a predetermined voltage during a precharge stage;

discharging said capacitor for a predetermined length of time through a pixel output transistor, said pixel output transistor being modulated by said light signal by applying said light signal to the gate of said pixel output transistor; and determining the voltage held by said capacitor as an output signal.

10. The method of claim 9 further including amplifying said output signal by placing said output signal onto the gate of an amplifying output transistor.

* * * * *

UNITED STATES PATENT AND TRADEMARK OFFICE
CERTIFICATE OF CORRECTION

PATENT NO.     : 6,734,413 B2
DATED          : May 11, 2004
INVENTOR(S)    : Tiejun Dai It is certified that error appears in the above-identified patent and that said Letters Patent is hereby corrected as shown below:

<u>Column 1,</u>
Line 18, "modem" should be -- modern --.

Signed and Sealed this

Fifteenth Day of March, 2005

JON W. DUDAS
*Director of the United States Patent and Trademark Office*